US008750718B2

(12) United States Patent
Lee et al.

(10) Patent No.: US 8,750,718 B2
(45) Date of Patent: Jun. 10, 2014

(54) APPARATUS FOR CONTROLLING LIGHTING EQUIPMENT FOR LIGHTING COMMUNICATION

(75) Inventors: Kyung-Woo Lee, Yongin-si (KR); Dominic O'Brien, Oxford (GB); Dae-Kwang Jung, Suwon-si (KR)

(73) Assignees: Samsung Electronics Co., Ltd (KR); The Chancellor, Masters and Scholars of the University of Oxford (GB)

( * ) Notice: Subject to any disclaimer, the term of this patent is extended or adjusted under 35 U.S.C. 154(b) by 466 days.

(21) Appl. No.: 12/709,009

(22) Filed: Feb. 19, 2010

(65) Prior Publication Data

US 2010/0209119 A1    Aug. 19, 2010

(30) Foreign Application Priority Data

Feb. 19, 2009  (KR) .......................... 10-2009-0014116

(51) Int. Cl.
    *H04B 10/00*    (2013.01)
    *H04B 10/04*    (2006.01)
(52) U.S. Cl.
    USPC ............ 398/172; 398/183; 398/182; 398/118
(58) Field of Classification Search
    CPC .............. H04B 10/11; H04B 10/1123; H04B 10/1149; H04B 10/116; H04B 10/1129
    USPC ........... 398/172, 182–183, 118; 372/9, 38.02, 372/38.07
    See application file for complete search history.

(56) References Cited

U.S. PATENT DOCUMENTS

| 4,596,995 | A  | * | 6/1986  | Yamakawa et al. ............ 347/237 |
| 5,337,075 | A  | * | 8/1994  | Takahashi et al. ............ 347/239 |
| 6,548,967 | B1 | * | 4/2003  | Dowling et al. .............. 315/318 |
| 6,600,899 | B1 | * | 7/2003  | Radomsky et al. .......... 455/3.05 |
| 7,230,884 | B2 | * | 6/2007  | Shemesh ......................... 368/46 |
| 7,235,934 | B2 | * | 6/2007  | Hung et al. .................... 315/312 |
| 7,352,350 | B2 | * | 4/2008  | Nitta et al. ...................... 345/94 |
| 7,439,847 | B2 | * | 10/2008 | Pederson ..................... 340/5.81 |
| 7,583,901 | B2 | * | 9/2009  | Nakagawa et al. ........... 398/183 |
| 7,642,730 | B2 | * | 1/2010  | Dowling et al. .............. 315/292 |
| 7,932,876 | B2 | * | 4/2011  | Jo et al. ........................... 345/76 |
| 8,019,229 | B2 | * | 9/2011  | Fujiwara ....................... 398/172 |

(Continued)

FOREIGN PATENT DOCUMENTS

WO    WO 2007049489 A1 *  5/2007

OTHER PUBLICATIONS

Fairchild Semiconductor, "FAN5608 Serial / Parallel LED Driver with Current-Regulated, Step-Up DC/DC Converter", Aug. 2006.

(Continued)

*Primary Examiner* — Ken Vanderpuye
*Assistant Examiner* — Abbas H Alagheband
(74) *Attorney, Agent, or Firm* — The Farrell Law Firm, P.C.

(57) ABSTRACT

Disclosed is an apparatus for controlling an illumination device for optical communication, including an optical array having a plurality of light emitting elements, a visible ray communication unit for outputting an electrical signal for visible ray communication, an optical array driving unit for providing a control signal for individually controlling ON/OFF of the plurality of light emitting elements, and a logic operation unit for performing logic operations on signals provided from the visible ray communication unit and the optical array driving unit, and outputting resultant operated signals to the optical array.

5 Claims, 5 Drawing Sheets

(56) References Cited

U.S. PATENT DOCUMENTS

| | | | |
|---|---|---|---|
| 8,126,554 B2* | 2/2012 | Kane et al. | 607/22 |
| 8,498,030 B2* | 7/2013 | Ichikawa | 358/509 |
| 2006/0056855 A1* | 3/2006 | Nakagawa et al. | 398/183 |
| 2006/0176261 A1* | 8/2006 | Nitta et al. | 345/94 |
| 2006/0239689 A1* | 10/2006 | Ashdown | 398/130 |
| 2007/0024571 A1* | 2/2007 | Maniam et al. | 345/102 |
| 2007/0053693 A1* | 3/2007 | Houck et al. | 398/117 |
| 2007/0104239 A1* | 5/2007 | Koga | 372/45.01 |
| 2007/0120786 A1* | 5/2007 | Bellls et al. | 345/84 |
| 2007/0138979 A1* | 6/2007 | Yamada et al. | 315/291 |
| 2008/0044188 A1* | 2/2008 | Kagawa et al. | 398/128 |
| 2008/0181617 A1* | 7/2008 | Ann | 398/158 |
| 2009/0196622 A1* | 8/2009 | Shin et al. | 398/118 |
| 2009/0284366 A1* | 11/2009 | Haartsen et al. | 340/531 |
| 2010/0096993 A1* | 4/2010 | Ashdown et al. | 315/113 |
| 2010/0119233 A1* | 5/2010 | Hayashi | 398/106 |
| 2010/0149084 A1* | 6/2010 | Chida | 345/102 |

OTHER PUBLICATIONS

National Semiconductor, "LM27966, White LED Driver with I2C Compatible Interface", Aug. 2006.

F.J. Lopez_Hernandez, "Low-Cost Diffuse Wireless Optical Communication System based on White LED", IEEE, Jun. 28, 2006.

Hidemitsu Sugiyama et al., "Brightness Control Methods for Illumination and Visible-Light Communication Systems", Proceedings of the Third International.

Conference on Wireless and Mobile Communications (ICWMC'07), 2007.

* cited by examiner

APPARATUS FOR CONTROLLING LIGHTING EQUIPMENT FOR LIGHTING COMMUNICATION

PRIORITY

This application claims priority to an application entitled "Apparatus For Controlling Lighting Equipment For Lighting Communication" filed with the Korean Intellectual Property Office on Feb. 19, 2009 and assigned Serial No. 10-2009-0014116, the contents of which are incorporated herein by reference.

BACKGROUND OF THE INVENTION

1. Field of the Invention

The present invention relates generally to an apparatus for controlling an illumination device, and more particularly, to an apparatus for controlling an illumination device capable of performing optical communication.

2. Description of the Related Art

Extensive research has recently been conducted on the use of a light emitting element in illumination devices. Due to the increase in the luminary power of a light emitting element, such as a Light Emitting Diode (LED), it has become possible to realize an illumination device by using such a light emitting element. Furthermore, next-generation illumination devices are being targeted for extensive use of light emitting elements, due to their inherent long life, high efficiency, and high-speed response properties.

A light emitting element-using illumination device requires a relatively high optical power, and thus generally has a configuration in which a plurality of light emitting elements such as white LEDs are mounted in a circuit board to constitute one module.

FIG. 1 illustrates a conventional light emitting element-using illumination device. Referring to FIG. 1, the conventional light emitting element-using illumination device includes an optical array 10 provided with a plurality of light emitting elements such as LEDs 11, 12, 13, 14, and 15, and an optical array driving unit 20 for controlling the driving of the optical array 10. The optical array driving unit 20 controls the driving of the optical array 10 by using a control signal based on Pulse Width Modulation (PWM) in order to reduce the heat-generation and power-consumption of the light emitting element.

For example, the optical array driving unit 20 outputs a PWM control signal to the optical array 10 in consideration of an illumination device user's required brightness and the user's recognizable lighting frequency. Also, the optical array 10 lights the light emitting elements 11, 12, 13, 14, and 15 in unison, to generate an illumination light with a user's required brightness.

Meanwhile, as portable wireless devices are becoming even more widely used, these devices have incorporated the use of a wireless signal, such as infrared rays or radio waves. However, the use of such wireless communication devices is compromised due to depletion of radio wave resources, and the influence on a human body (e.g., eyes) and a medical device. Accordingly, there has been developed a wireless visible ray communication using a visible ray that is a safer transmission medium for communication compared to a conventional medium. Furthermore, research has been conducted on developing technology for applying the wireless visible ray communication to the above described light emitting element-using illumination device.

However, the above described light emitting element-using illumination device is generally configured such that the light emitting elements 11, 12, 13, 14, and 15 provided within the optical array 10 can be lit at one time, by using a PWM control signal. Accordingly, when the wireless visible ray communication is applied to the illumination device, the communication ends in the interval where the light emitting elements 11, 12, 13, 14, and 15 are off, causing a reduction in communication efficiency. In addition, a communication signal is inefficiently modulated in consideration of the timing of the interval where the light emitting elements 11, 12, 13, 14, and 15 are off.

SUMMARY OF THE INVENTION

Accordingly, the present invention has been made to solve at least the above-mentioned problems occurring in the prior art, and the present invention provides an apparatus for controlling an illumination device for optical communication, which can continuously transmit signals for optical communication without a delay interval.

An aspect of the present invention is to provide an apparatus for controlling an illumination device for optical communication, which can easily modulate a signal for optical communication without consideration of ON/OFF timings of light sources provided in the optical communication illumination.

Another aspect of the present invention is to provide an apparatus for controlling an illumination device for optical communication, which can control illumination brightness and the strength of a communication signal by controlling the gain of a signal for the optical communication.

In accordance with the present invention, there is provided an apparatus for controlling an illumination device for optical communication, including an optical array having a plurality of light emitting elements, a visible ray communication unit for outputting an electrical signal for visible ray communication, an optical array driving unit for providing a control signal for individually controlling ON/OFF of the plurality of light emitting elements, and a logic operation unit for performing logic operations on signals provided from the visible ray communication unit and the optical array driving unit, and outputting resultant operated signals to the optical array.

BRIEF DESCRIPTION OF THE DRAWINGS

The above and other features, aspects, and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Hereinafter, embodiments of the present invention will be described in detail with reference to the accompanying drawings. Those of ordinary skill in the art will recognize that various changes and modifications of the embodiments described herein can be made without departing from the scope and spirit of the invention. In addition, descriptions of well-known functions and constructions are omitted herein for the sake of clarity and conciseness.

Figure 1:
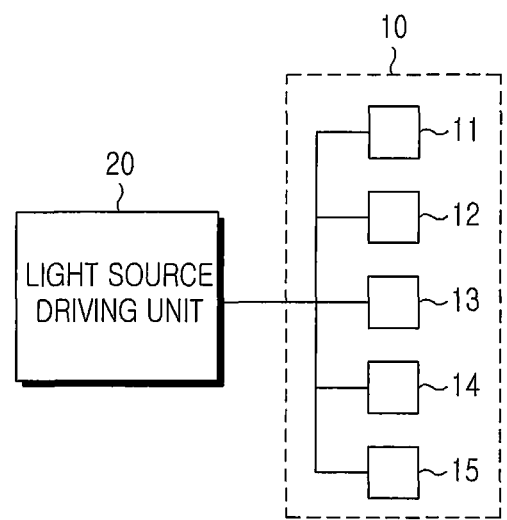
FIG. 1 illustrates a conventional light emitting element-using illumination device.
Figure 2:
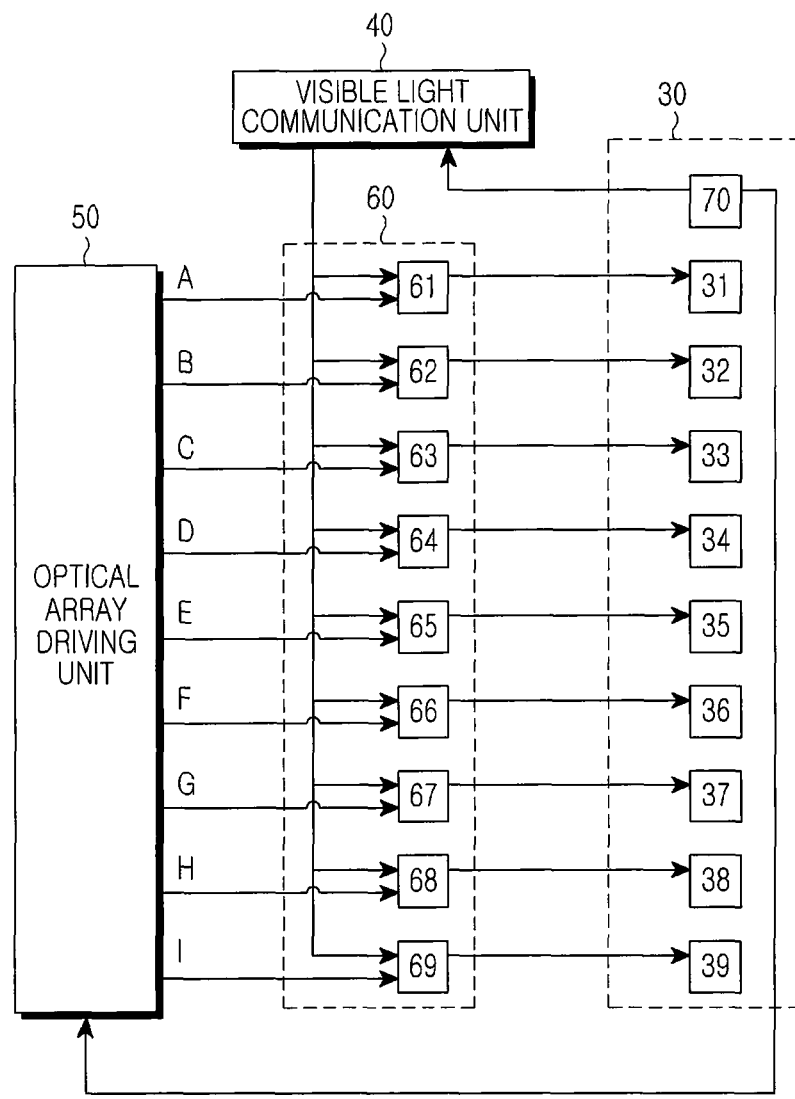
FIG. 2 illustrates an apparatus for controlling an illumination device for optical communication, according to a first embodiment of the present invention.

FIG. 2 illustrates an apparatus for controlling an illumination device for optical communication, according to a first embodiment of the present invention. Referring to FIG. 2, the controlling apparatus includes an optical array 30, a visible ray communication unit 40, an optical array driving unit 50, and a logic operation unit 60.

The optical array 30 includes a plurality of light emitting elements 31, 32, 33, 34, 35, 36, 37, 38 and 39 (hereinafter 31 to 39) for receiving a driving signal input via the logic operation unit 60, and turns on/off based on the driving signal, thereby converting an electrical signal provided from the visible ray communication unit 40 into a visible ray signal and outputting the visible ray signal.

The optical array 30 may further include a light receiving element 70 for detecting a light quantity and an optical signal from the outside. The light receiving element 70 may provide an electrical signal corresponding to the light quantity from outside of the optical array 30, to the optical array driving unit 50. Also, the light receiving element 70 may receive a visible ray communication signal transmitted via an external visible ray communication device, and convert the visible ray communication signal into an electrical signal, thereby providing the electrical signal to the visible ray communication unit 40.

The visible ray communication unit 40, based on a visible ray communication protocol, modulates and outputs data for visible ray communication. Also, the visible ray communication unit 40 demodulates the electrical signal input from the light receiving element 70 based on visible ray communication protocol.

The optical array driving unit 50 generates and outputs signals such as PWM control signals, for driving the respective light emitting elements 31 to 39 provided in the optical array 30. For this, the optical array driving unit 50 is provided with a plurality of output terminals A, B, C, D, E, F, G, H, and I (hereinafter A to I) corresponding to the number of light emitting elements 31 to 39. The signals output from the plurality of output terminals A to I, together with the signal output from the visible ray communication unit 40, are input to the logic operation unit 60.

In outputting PWM control signals via the plurality of output terminals A to I, the optical array driving unit 50 preferably outputs at least one ON signal via the output terminal at the same interval. In other words, the optical array driving unit 50 sets time slots corresponding to the number of light emitting elements 31 to 39, and outputs at least one ON signal in one time slot.

In outputting PWM control signals via the plurality of output terminals A to I, the optical array driving unit 50 preferably sequentially outputs ON signals to the plurality of output terminals A to I.

Figure 3:
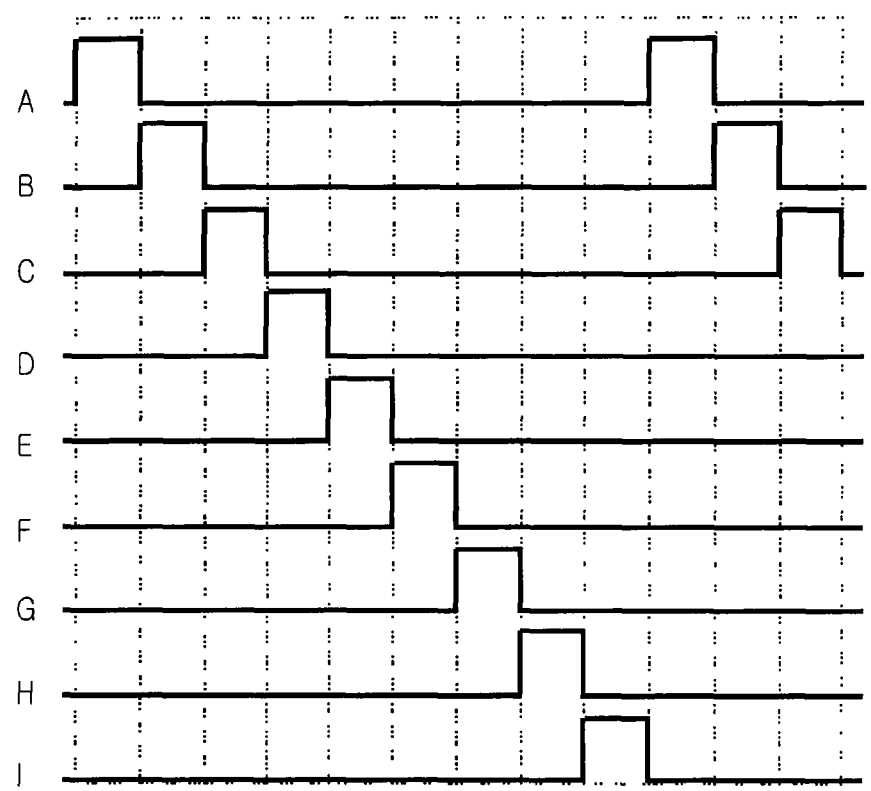
FIG. 3 illustrates signal timings of an optical array driving unit output terminal in an apparatus for controlling an illumination device for optical communication, according to a second embodiment of the present invention.
Figure 4:
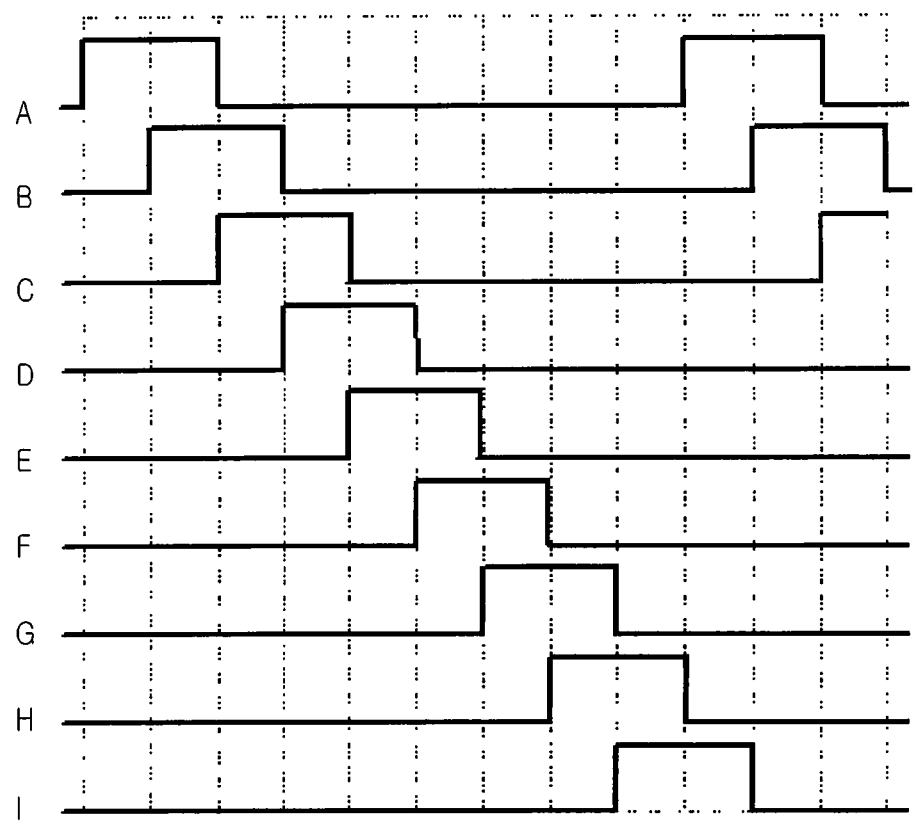
FIG. 4 illustrates signal timings of an optical array driving unit output terminal in an apparatus for controlling an illumination device for optical communication, according to a third embodiment of the present invention.

FIGS. 3 and 4 illustrate signal timings of an optical array driving unit output terminal in the controlling apparatus for the optical communication illumination according to second and third embodiments of the present invention, respectively. As shown in FIG. 3, the optical array driving unit may sequentially allocate ON timings of PWM control signals output from a first output terminal A, a second output terminal B, a third output terminal C, a fourth output terminal D, a fifth output terminal E, a sixth output terminal F, a seventh output terminal G, a eighth output terminal H, and a ninth output terminal I, to different time slots.

When the optical array driving unit 50 sequentially allocates ON timings of PWM control signals output from the first to ninth output terminals A to I, to different time slots in FIG. 3, at least one of the plurality of light emitting elements 31 to 39 may remain in an ON state. Accordingly, the optical array 30 continuously irradiates lights, and continuously converts the electrical signal received from the visible ray communication unit 40 into an optical signal and outputs the converted optical signal.

Furthermore, according to the response properties of the plurality of light emitting elements 31 to 39, a signal delay may occur during the conversion of a PWM control signal into an optical signal. Such a signal delay may interfere with the continuous output of the lights irradiated from the optical array 30. Accordingly, as shown in FIG. 4, the optical array driving unit, preferably outputs ON signals via two output terminals in one time slot.

Referring to FIGS. 2 and 4, since the light receiving element 70 provides an electrical signal corresponding to the light quantity from outside of the optical array 30, to the optical array driving unit 50, the optical array driving unit 50 may control the light quantity of the optical array 30 by adjusting the pulse width of the PWM control signal.

The logic operation unit 60 may include a plurality of logic elements 61, 62, 63, 64, 65, 66, 67, 68, and 69 (hereinafter 61 to 69) corresponding to the number of light emitting elements 31 to 39. The plurality of logic elements 61 to 69 include common input terminals and individual input terminals. All of the common input terminals of the plurality of logic elements 61 to 69 are connected to the output terminal of the visible ray communication unit 40, and commonly receive the input of an electrical signal from the visible ray communication unit 40. The individual input terminals of the plurality of logic elements 61 to 69 are connected to the output terminals A to I of the optical array driving unit 50, respectively, and individually receive the PWM control signals output from the output terminals A to I.

The plurality of logic elements 61 to 69 perform logic operations on respective input signals, and output the operated signals to the plurality of light emitting elements 31 to 39, respectively. The plurality of logic elements 61 to 69 may perform AND operations on signals input via the common input terminals and individual input terminals.

In an embodiment of the present invention, the optical array driving unit 50 sequentially allocates ON timings of PWM control signals output from the output terminals A to I, to different time slots, and the plurality of logic elements 61 to 69 are for performing AND operations on input signals. However, the present invention is not limited to this description. The signals output from the optical array driving unit 50 and the operation method of the plurality of logic elements 61 to 69 may be variable as long as the optical array 30 can continuously irradiate lights.

According to the above described controlling apparatus, the continuous irradiation of lights by the optical array 30 makes it possible to continuously transmit signals for optical communication without a pause interval. Also, since signals for the optical communication can be modulated without consideration of ON/OFF timings of light sources provided in an optical communication illumination, modulation of communication signals is more easily performed.

Figure 5:
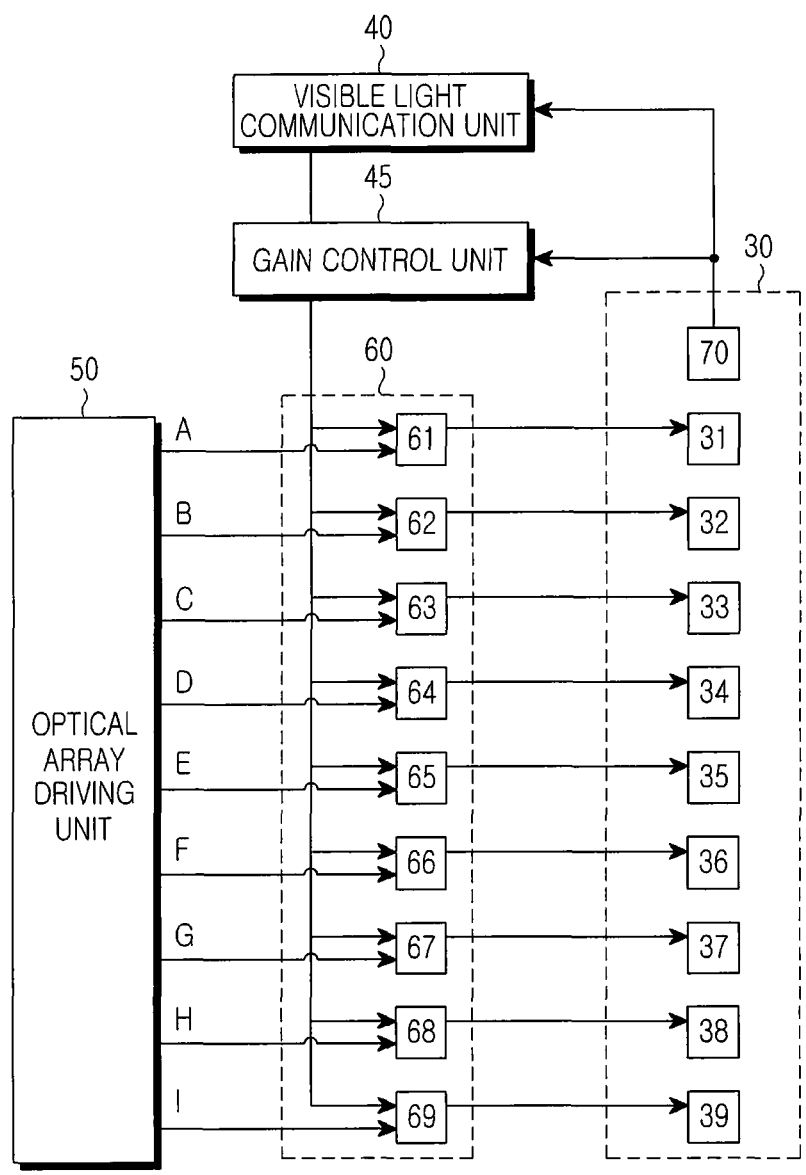
FIG. 5 illustrates an apparatus for controlling an illumination device for optical communication, according to a fourth embodiment of the present invention.

FIG. 5 illustrates an apparatus for controlling an illumination device for optical communication, according to a fourth embodiment of the present invention. Referring to FIG. 5, the controlling apparatus has the same configuration as that of the controlling apparatus according to the first embodiment of the present invention, shown in FIG. 2.

However, the apparatus illustrated in FIG. 5 is different from that one of the first embodiment of the present invention, in that it further includes a gain control unit 45. Accordingly, in the apparatus according to fourth embodiment of the present invention, a repeated description of constituents having substantially the same functional configurations as those of the apparatus according to the first embodiment of the present invention will be omitted for the sake of conciseness.

The gain control unit 45 is provided between the visible ray communication unit 40 and the logic operation unit 60. Also, an electrical signal corresponding to a light quantity from the outside, measured via the light receiving element 70, is provided to the gain control unit 45.

The gain control unit 45 which has received the electrical signal corresponding to the outside light quantity controls the gain of a signal output from the visible ray communication unit 40, thereby controlling the light quantity irradiated through the optical array 30. Particularly, when the brightness level of an illumination is reduced, the strength of a communication signal also may be reduced. Accordingly, the gain control unit 45 controls the gain level of a communication signal to maintain the communication signal strength even if the brightness level of an illumination is reduced. This may prevent the communication signal strength from being reduced by the reduction of the illumination brightness.

In this manner, the use of the gain control unit 45 may fixedly maintain the strength of a communication signal. Moreover, the coverage of a visible ray communication link, and the performance of received SNR (Signal to Noise Ratio) and BER (Bit Error Ratio) are all maintained.

In the apparatus according to the fourth embodiment of the present invention, it is possible to simply control the light quantity irradiated from the optical array 30 and the strength of a communication signal by using a signal output from the visible ray communication unit 40 without complicated modulation of the pulse width of a PWM control signal through the optical array driving unit 50.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for controlling an illumination device for optical communication, the apparatus comprising:
   an optical array including a plurality of light emitting elements;
   a visible ray communication unit for outputting an electrical signal for visible ray communication;
   an optical array driving unit for providing a control signal for individually controlling ON/OFF of the plurality of light emitting elements;
   a logic operation unit for performing logic operations on signals provided from the visible ray communication unit and the optical array driving unit, and outputting resultant operated signals to the optical array; and
   a gain control unit for controlling a gain of the signal output from the visible ray communication unit,
   wherein the optical array driving unit provides the control signal for controlling at least two light emitting elements to be in an ON state within a same time slot, and
   wherein the gain control unit is provided between the visible ray communication unit and the logic operation unit.

2. The apparatus as claimed in claim 1, wherein the optical array driving unit controls the plurality of light emitting elements into ON states in different time slots.

3. The apparatus as claimed in claim 1, wherein the logic operation unit comprises a plurality of logic elements connected to the plurality of light emitting elements, respectively,
   wherein the logic elements include common input terminals for receiving input of the electrical signal from the visible ray communication unit, and individual input terminals for receiving inputs of control signals individually provided from the optical array driving unit, respectively.

4. The apparatus as claimed in claim 3, wherein the logic elements perform AND operations on signals input via the common input terminals and the individual input terminals, and output resultant operated signals.

5. The apparatus as claimed in claim 1, wherein the optical array driving unit outputs the control signal for controlling each light emitting element to keep the ON state in at least two consecutive time slots.

* * * * *